United States Patent

Manno

Patent Number: 5,600,917
Date of Patent: Feb. 11, 1997

[54] COMPOUND FISH HOOK ASSEMBLY

[76] Inventor: Joseph T. Manno, Star Route, Box 24, Kane, Pa. 16735

[21] Appl. No.: 463,748

[22] Filed: Jun. 5, 1995

[51] Int. Cl.$^6$ .............................. A01K 83/00; A01K 91/04
[52] U.S. Cl. ............................... 43/44.82; 43/44.83
[58] Field of Search ........................... 43/42.49, 44.82, 43/44.83, 43.16

[56] References Cited

U.S. PATENT DOCUMENTS

| | | | |
|---|---|---|---|
| 279,206 | 6/1883 | Van Altena | 43/43.15 |
| 454,581 | 6/1891 | Mack | 43/44.82 X |
| 469,015 | 2/1892 | Hemenway | 43/44.98 |
| 730,064 | 6/1903 | Wilson | 43/42.49 |
| 766,565 | 8/1904 | Wilson | 43/42.49 |
| 989,869 | 4/1911 | Pflueger | 43/42.49 |
| 1,227,325 | 5/1917 | Schilling | 43/42.74 |
| 2,518,634 | 8/1950 | Peterson | 43/44.92 X |
| 2,532,045 | 11/1950 | Walsh | 43/44.98 |
| 2,554,735 | 5/1951 | Gibson | 43/44.82 |
| 2,621,438 | 12/1952 | Helin | 43/44.82 |
| 2,750,704 | 6/1956 | Bemis | 43/43.16 |
| 2,796,695 | 6/1957 | Meulnart | 43/44.86 |
| 2,870,563 | 1/1959 | Rose | 43/41 |
| 2,926,454 | 3/1960 | Gottman | 43/44.83 |
| 2,984,882 | 5/1961 | Winn | 43/44.83 |
| 2,984,930 | 5/1961 | Fadely | 43/44.84 |
| 3,002,310 | 10/1961 | Ferguson | 43/37 |
| 3,331,151 | 7/1967 | Turrentine | 43/44.82 |
| 3,453,769 | 7/1969 | Chandler | 43/44.98 |
| 3,604,143 | 9/1971 | Sauers | 43/44.83 |
| 3,736,691 | 6/1973 | Gist | 43/44.82 |
| 3,798,824 | 3/1974 | Nikota | 43/43.15 |
| 3,936,971 | 2/1976 | McGahee | 43/44.83 |

FOREIGN PATENT DOCUMENTS

| | | |
|---|---|---|
| 1123195 | 5/1982 | Canada. |
| 23462 | 5/1908 | United Kingdom. |

Primary Examiner—Joseph J. Hail, III
Assistant Examiner—Jay A. Stelacone
Attorney, Agent, or Firm—Nixon & Vanderhyde P.C.

[57] ABSTRACT

A compound fish hook assembly includes a hook support ring; first, second and third adjacent hooks each having a shank portion, a connector loop at one end thereof and a hook portion at an opposite end thereof, the support ring extending through each of the connector loops. The first, second and third adjacent hooks are shaped such that when hanging loosely from the ring, the shank portion and hook portion of each hook lies in a radial plane angularly spaced from a corresponding radial plane of the adjacent hook relative to a vertical centerline of the compound fish hook assembly, and the shank portion of each hook lies on an opposite side of the vertical centerline from the hook portion.

14 Claims, 2 Drawing Sheets

COMPOUND FISH HOOK ASSEMBLY

This invention relates to a compound fish hook assembly and specifically, to a triple hook wherein each of three hooks hangs loosely from a support ring.

BACKGROUND OF THE INVENTION

Compound hooks are generally known in the fishing art, and examples may be found in U.S. Pat. Nos. 5,265,370; 3,002,310; 2,796,695; 2,621,438; 454,581; and 279,206. In such compound fish hooks, generally two and sometimes three hooks are employed. In most instances, and particularly when three hooks are employed, externally applied sleeves or other structures are utilized to confine the motion of the hooks relative to each other. For example, in U.S. Pat. No. 5,265,370, clips are employed to hold the respective shank portions of the hooks in a predetermined alignment. In U.S. Pat. No. 2,796,695, a sleeve is telescoped over the respective shank portions of the hooks for a similar purpose. In U.S. Pat. No. 454,581, the connectors of each hook are confined to movement about a single axis by mounting the hooks to a pin or shaft such that there is but one degree of movement permitted for each hook.

When the respective hooks of a compound fish hook assembly are secured together for limited movement a fish is able to tear loose from the hook and this is particularly true where all of the hooks are forced to move as a unit. Thus, there remains a need for a simple yet effective compound fish hook assembly.

SUMMARY OF THE INVENTION

It is the principal objective of this invention, to provide a more effective but simple to construct and easy to use compound fish hook assembly.

In the exemplary embodiment described in further detail below, three hooks are loosely mounted on an annular support ring. Each hook includes a curved shank portion and a hook portion which terminates in a conventional barbed hook. The end of the shank portion remote from the hook portion includes a connector loop. In the preferred embodiment, the shank portions and connectors of the respective hooks are shaped and configured so that when the hooks are hanging loosely from the angular support ring, the hooks extend in radial directions from a vertical center line of the compound fish hook assembly so as to present a substantially Y shape when viewed in plan. Moreover, because of the curvature imparted to the shank portions of the respective hooks, at least part of the shank portion of any one of the hooks lies on the opposite side of the vertical center line of the compound fish hook assembly from its respective hook portion. At the same time, the connector loops remain substantially parallel when the hooks are hanging loosely from the support ring.

In order to achieve the above described orientation, the connectors of two of the hooks, which are provided in the form of open eyes, are twisted approximately 45° relative to a plane containing their respective shank and hook portions. The third hook is formed such that the connector, or open eye, lies in the same plane as the shank portion and hook portion of the third hook. Thus, when the hooks are secured to the support ring, the open eyes lie in substantially parallel arrangement relative to each other even though the shank portion and hook portions lie at significant angles relative to each other.

It will thus be appreciated that each of the hooks is free to move independently of adjacent hooks either by pivoting movement relative to the closed ring, or by sliding movement about the ring itself. As a result, when a fish strikes the compound fish hook assembly from one side and is hooked by the closest hook portion of one of the fish hooks, at least one of the shank portions of another of the hooks is forced outwardly and into contact with the other side of the fish's mouth, creating a spreading effect and maintaining penetration even though the fish spreads his mouth in an attempt to work its way free. In other words, since there is no holding structure in the center of the compound fish hook assembly constraining the movement of the hooks, more effective and efficient hooking action is obtained.

The compound fish hook assembly as described herein, is shown in combination with a line connector which takes advantage of the knotless securement technique as described in my prior U.S. Pat. Nos. 4,107,866; 4,209,933; 4,294,031; 4,819,366; and 4,905,403. More specifically, the annular ring to which the three fish hooks are secured forms one end of a connector. The other end of the connector is formed with all open eye, with a stem connecting the closed annular ring and the open eye. The stem is coincident with the vertical center line of the compound fish hook assembly. To effect knotless securement of the fishing line, the line is first threaded through the closed annular ring and doubled back on itself to form a loop. The loop is then wrapped around the stem and pulled into the open eye. This combination of knotless securement and unique compound fish hook design provides a greatly improved and enhanced compound fish hook which is simple in design, easy to use and inexpensive to manufacture.

In accordance with a first aspect of the invention, there is provided a compound fish hook assembly comprising a hook support ring: first, second and third adjacent hooks each having a shank portion, a connector loop at one end thereof and a hook portion at an opposite end thereof, the support ring extending through each of the connector loops; wherein the first, second and third adjacent hooks are shaped such that, when hanging loosely from the ring, the shank portion and hook portion of each hook lies in a radial plane angularly spaced from a corresponding radial plane of the adjacent hook relative to a vertical centerline of the compound fish hook assembly.

In accordance with another aspect of the invention, there is provided a compound fish hook assembly comprising a hook support; first, second and third hooks loosely hanging from the support, each hook having a shank portion, a hook portion and a connector, said hooks so configured that they assume without constraint a generally Y-shaped configuration when viewed in plan, and wherein shank portions of each hook lie on opposite sides of a vertical center line through the assembly from respective hook portions of each hook.

Additional objects and advantages of the invention will become apparent from the detailed description which follows.

DETAILED DESCRIPTION OF THE DRAWINGS

Figure 1:
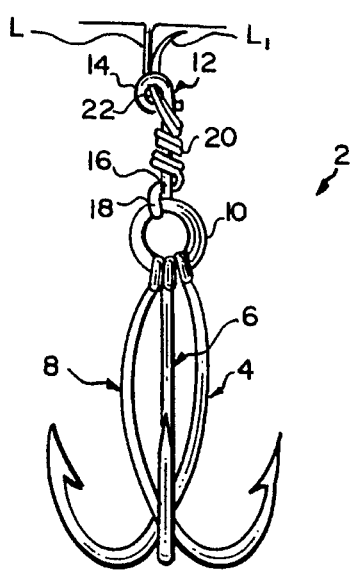
FIG. 1 is an elevation of the compound hook assembly in accordance with an exemplary embodiment of the invention.
Figure 4:
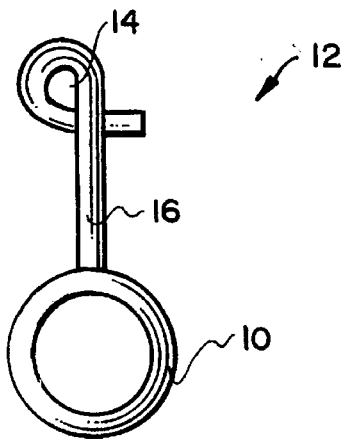
FIG. 4 is an elevation of the hook support shown in FIG. 1.

With reference to FIG. 1, a compound hook assembly in accordance with this invention is shown at 2 and includes three hooks 4, 6 and 8 loosely or freely hanging from a closed ring 10 of a line connector or hook support 12. The ring 10 is formed at one end of the connector 12 while an open eye 14 is formed at the opposite end of the connector 12, with a shaft or stem 16 extending therebetween (see also FIG. 4). A line L is secured to the assembly 2 utilizing the knotless technique generally as described in my above identified prior U.S. Patents. Here, the line L is threaded through the ring 10 at 18 and doubled back on itself to form a loop. The overlapped strands or lines are then wrapped about the stem 16 as shown at 20 and then pulled into the open eye 14 as shown at 22. The short free end of the looped portion of the line L is shown at L1.

The hook 4 is formed with a curved shank portion 24, and a hook portion 26 which terminates at a barbed hook 28. Likewise, hook 6 includes a curved shank portion 30, and a hook portion 32 terminating at a barbed hook 34. The third hook 8 includes a curved shank portion 36, and a hook portion 38 terminating at a barbed hook 40. Except as noted below, it can be seen from the Figures that the hooks 4, 6 and 8 are essentially identical.

Figure 2:
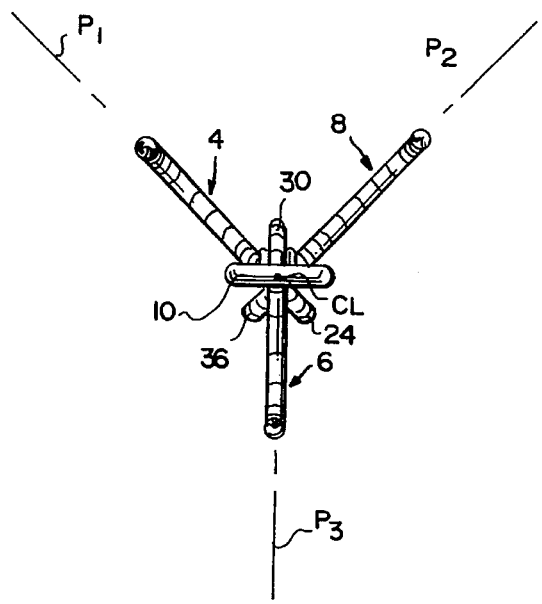
FIG. 2 is a plan view of the hook assembly shown in FIG. 1, but with the fishing line removed.
Figure 3:
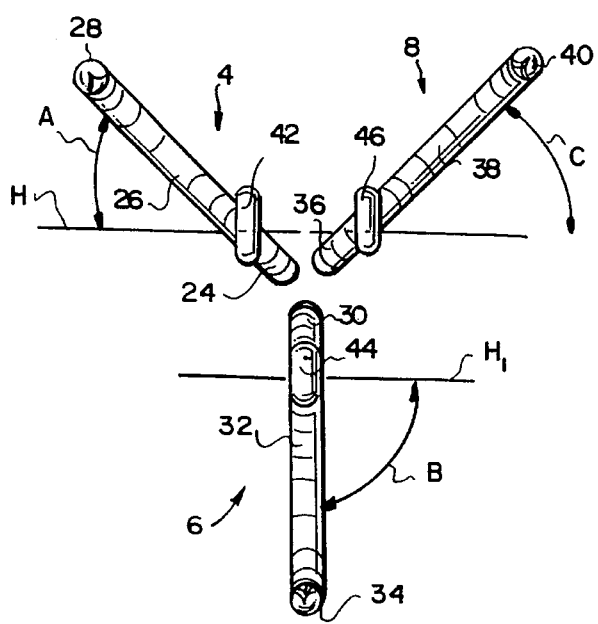
FIG. 3 is an exploded view of the compound hook assembly shown in FIG. 2.

A significant distinction between the hooks, however, lies in the orientation of the connector loops or eyes at the upper ends of the respective shank portions. Thus, hook 4 is formed with a closed loop or eye 42 which extends at a 45° angle from the plane represented by the shank portion 24 and hook portion 26. This 45° angle can also be expressed as the angle between the plane of the hook and shank portions and a horizontal line H extending through the eye of the loop 42 and referred to as angle A in FIG. 3. The hook 6 includes a closed loop or eye 44 at the upper end of the shank portion 30 which remains in the same plane as the shank portion 30 and hook portion 32. This arrangement can also be explained in terms of the hook as well as the eye 44 lying in a plane which is 90° to a line $H_1$ passing through the loop 44 as indicated by angle B in FIG. 3. Finally, the hook 8 is provided with a closed loop or eye 46 at the upper end of the shank portion 36 which also lies at 45° angle relative to the plane containing the shank portion 36 and hook portion 38. This relationship can be stated in terms of the plane containing the shank 36 and hook 38 lying at a 45° angle relative to the line H through the center of the loop or eye 46, as indicated by angle C. The lines passing through the various loops or eyes 42, 44 and 46 would generally correspond to the direction of the localized portion of the ring 20 passing through the eyes or loops as best seen in FIGS. 1 and 2, and, in this regard, in the assembled state, lines H and $H_1$ would be coincident. Thus, the hooks 4, 6 and 8 assume a "Y" configuration when viewed in plan, with a 90° angle between the radial planes defined by the hook and shank portions of hooks 4 and 8; a 135° angle between the radial planes defined by the hook and shank portions of hooks 8 and 6; and a similar 135° angle between the radial planes defined by the hook and shank portion of hooks 6 and 4. These planes are indicated at $P_1$, $P_2$ and $P_3$ in FIG. 2, extending from a vertical center line CL.

With the above described arrangement, the shank portions 24, 30 and 36 of the respective hooks 4, 6 and 8 bow outwardly so as to project from opposite sides of the center line CL from the respective hook portions. As a result, when any of the shank portions 24, 30 and 36 are contacted by a fish biting on the hook assembly, the hook portions of one or both of the remaining hooks are forced outwardly, thus creating a spreading effect and maintaining penetration by respective barbed hooks 28, 34 and 40 since there is no center structure holding the hooks together which otherwise would enable the fish to tear loose from the hook. In other words, it is the unique shape of the hook shank portions 24, 30 and 36, and the orientation of connector eyes or loops 42, 44 and 46, along with the general freedom of movement of the respective hooks 4, 6 and 8 on the ring 10 which increases the efficiency of the hooking action. In this regard, each hook 4, 6 and 8 is permitted to move independently of each other, not only in the sense of pivotal movement relative to the ring 10, but also in the sense of swinging movement as the connectors slide about the ring. By making the eyes 42, 44 and 46 larger than the cross sectional diameter of ring 10, even great relative movement is permitted.

Figure 5:
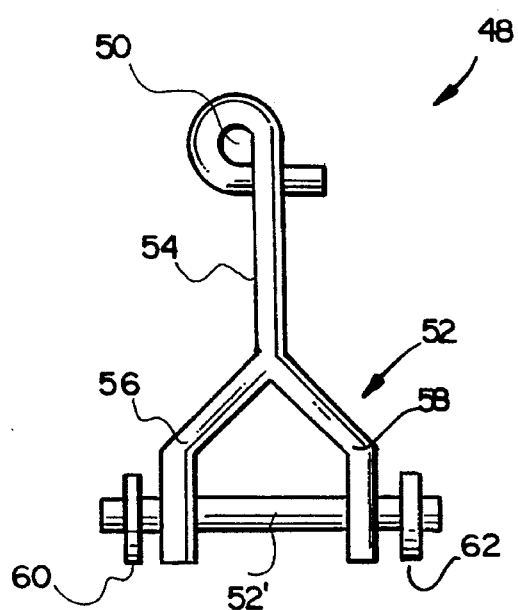
FIG. 5 is an elevation of an alternative hook support device in accordance with the invention.

Turning now to FIG. 5, an alternative line connector or hook support 48 is shown which includes an open eye 50 at one end, and a clevis 52 at an opposite end, connected via stem 54. The clevis 52 includes spaced apart legs 56, 58 which merge with the stem 54. A clevis pin 52' extends through holes in the legs 56, 58 and may be secured in place by cap washers 60, 62 or other suitable means (C-clips, cotter pins, etc). With this alternative connector, the three hooks shown in FIGS. 1–3, will be supported by the clevis pin 52, but will otherwise assume the same orientation as described in connection with FIGS. 1–3.

It will be appreciated that the combination of the new and unique triple hook assembly 2 of this invention and my previously patented knotless securement technique, provides an overall much improved compound hook design. The knotless securement technique is not limited, of course, to the compound fish hook and has widespread applicability to other hook arrangements (as shown, e.g., in my above identified patents and in my copending application Ser. No. 08/426,720, filed Apr. 21, 1995, line splicers (as shown, e.g., in my copending application Ser. No. 08/430,840, filed Apr. 28, 1995, swivel arrangements, spinners and other commercial/industrial applications.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A compound fish hook assembly comprising:

a hook support ring;

first, second and third adjacent hooks each having a shank portion, a connector loop at one end thereof and a hook portion at an opposite end thereof, said support ring extending through each of said connector loops such that said hooks hang loosely from said support ring for pivotal and sliding movement relative thereto; wherein said first, second and third adjacent hooks are shaped such that, when hanging loosely from said ring, the shank portion and hook portion of each hook lies in a radial plane angularly spaced from a corresponding radial plane of the adjacent hook relative to a vertical centerline of the compound fish hook assembly, and the shank portion of each hook lies on an opposite side of said vertical centerline from said hook portion.

2. The compound fish hook assembly of claim 1 wherein, said said first, second and third hooks are hanging loosely from said ring, said connector loops are substantially parallel.

3. The compound fish hook assembly of claim 1 wherein the shank portion of each hook is bowed outwardly in a direction away from its respective hook portion.

4. The compound fish hook of claim 1 wherein said hook support ring is connected to an open eye by means of an axial stem.

5. A compound fish hook assembly comprising:

a hook support ring;

first, second and third adjacent hooks each having a shank portion, a connector loop at one end thereof and a hook portion at an opposite end thereof, said support ring extending through each of said connector loops; wherein said first, second and third adjacent hooks are shaped such that, when hanging loosely from said ring, the shank portion and hook portion of each hook lies in a radial plane angularly spaced from a corresponding radial plane of the adjacent hook relative to a vertical centerline of the compound fish hook assembly, the shank portion of each hook lies on an opposite side of said vertical centerline from said hook portion, said connector loops are substantially parallel; and wherein for two of said first, second and third hooks, respective connecting loops are bent at about a 45° angle to the planes containing the shank portion and hook portion thereof.

6. The compound fish hook assembly of claim 5 wherein for a remaining one of said first, second and third hooks, the connecting loop is coplanar with its respective shank portion and hook portion.

7. A compound fish hook assembly comprising:

a hook support;

first, second and third hooks loosely hanging from said support, each hook having a shank portion, a hook portion and a connector, said hooks so configured that they assume without constraint a generally Y-shaped configuration when viewed in plan, and wherein shank portions of each hook lie on opposite sides of a vertical center line through said assembly from respective hook portions of each hook.

8. The compound fish hook assembly of claim 7 wherein said hook support comprises a ring and each of said connectors comprises a loop.

9. The compound fish hook assembly of claim 7 wherein said hook support includes a ring and an open eye connected by a stem.

10. The compound fish hook assembly of claim 7 wherein one of said hooks is shaped such that said hook portion, shank portion and connector lie in a single plane.

11. The compound fish hook assembly of claim 10 wherein two remaining hooks are each shaped such that said hook portion and shank portion lie in one plane, and said connector is oriented at an angle relative to said one plane.

12. A compound fish hook assembly comprising:

a hook support;

first, second and third hooks loosely hanging from said support, each hook having a shank portion, a hook portion and a connector, said hooks so configured that they assume without constraint a generally Y-shaped configuration when viewed in plan, and wherein shank portions of each hook lie on opposite sides of a vertical center line through said assembly from respective hook portions of each hook; and wherein said hook support comprises a clevis and clevis pin located at one end of a stem, and an open eye at the other end of the stem.

13. A compound fish hook assembly comprising:

a hook support;

first, second and third hooks loosely hanging from said support, each hook having a shank portion, a hook portion and a connector, said hooks so configured that they assume without constraint a generally Y-shaped configuration when viewed in plan, and wherein shank portions of each hook lie on opposite sides of a vertical center line through said assembly from respective hook portions of each hook; wherein one of said hooks is shaped such that said hook portion, shank portion and connector lie in a single plane, and two remaining hooks are each shaped such that said hook portion and shank portion lie in one plane, and said connector is oriented at an angle relative to said one plane, and wherein said angle is about 45°.

14. A compound fish hook and line assembly comprising;

a hook support;

first, second and third hooks loosely hanging from said support, each hook having a shank portion, a hook portion and a connector, said hooks so configured that they assume without constraint a generally Y configuration when viewed in plan, and wherein shank portions of each hook lie on opposite sides of a vertical center line through said assembly from respective hook portions of each hook; wherein said hook support includes a ring and an open eye connected by a stem; and wherein a line is threaded through said ring, wrapped about said stem and drawn into said open eye.

* * * * *